July 7, 1959

J. FELGATE 2,893,427

VALVE STRUCTURE

Filed Aug. 11, 1955

Inventor
JACK FELGATE,

By

Attorneys

July 7, 1959   J. FELGATE   2,893,427
VALVE STRUCTURE
Filed Aug. 11, 1955   2 Sheets-Sheet 2

Inventor
JACK FELGATE,
By Larson and Whiting
Attorneys

United States Patent Office 2,893,427
Patented July 7, 1959

2,893,427

VALVE STRUCTURE

Jack Felgate, Slough, England, assignor to Ronald Trist & Co. Limited, Slough, England Application August 11, 1955, Serial No. 527,794

Claims priority, application Great Britain August 12, 1954

5 Claims. (Cl. 137—620)

This invention relates to valves which control the flow of compressed air or other fluid and are operated by magnetic coupling devices. Such coupling devices, which depend on the interaction of two magnets, are very convenient because the two magnets can be mounted on opposite sides of a wall of a container. One magnet can therefore be moved by a float in accordance with a varying liquid level in the container and, if the two magnets present like poles to one another, the second will move with snap action when the first reaches predetermined positions as the float moves up and down. Commonly the magnets are mounted to rock about parallel axes.

One apparatus in which it is convenient to operate an air valve by such a coupling device is used for supplying feed water to boilers used for heating trains driven by electric or diesel-electric locomotives. In this apparatus a feed-water valve is opened or closed by the pressure of compressed air on a piston or diaphragm in a chamber, and it is necessary either to connect this chamber to the source of supply of compressed air or to vent it to the atmosphere. The air valve must do this, and should not allow any leakage of air. Now, even with the use of modern magnetic alloys, the amount of power that can be transmitted through such a magnetic coupling is small, and the force available to move the valve member on and off its seating and to hold it on its seating against air or other pressure is small. The size of the various moving parts of the valve must therefore be small having regard to this force, and the area of the valve member exposed to the pressure must be such that the resultant force of the magnet and the pressure is sufficient to keep the valve firmly closed. Obviously, the higher the pressure, the smaller the area of the valve member must be. It is however very difficult to make such small parts with sufficient accuracy to ensure that the valve member will fit truly; this can be done only if the moving parts are made with the accuracy to which instrument makers habitually work. This is clearly very expensive and is not suited to large-scale production.

The primary object in this invention is to provide a mechanism by which such an air valve can be tightly closed and held closed despite the small power available, and yet which only demands in its manufacture such accuracy as is readily and economically obtainable in engineering works engaged in large-scale production.

In the present invention the flow of fluid through two passages each containing a valve seat is controlled by two opposed and substantially coaxial valve members mounted in a common frame which is connected to the driven member of magnetic actuating means by a mechanical linkage. In carrying one valve member onto its seat the frame carries the other valve member off its seat. In addition the frame has slight freedom of movement permitting each valve member in turn to fit closely on its seat. The use of a common frame ensures that the valve members must move simultaneously and reciprocally, and the limited free movement which is allowed to the frame enables each valve member to engage its seat fully despite those minor inaccuracies or tolerances in manufacture which are acceptable in large-scale production.

In the use of the invention in an apparatus for supplying feed water as described above, the flow of compressed air to or from piston or the diaphragm chamber can be and preferably is very small. Accordingly only a very small movement of each valve is required in order to provide an adequate opening for the air flow.

The preferred valve according to the invention will now be described with reference to the accompanying drawings in which.

Figure 1:
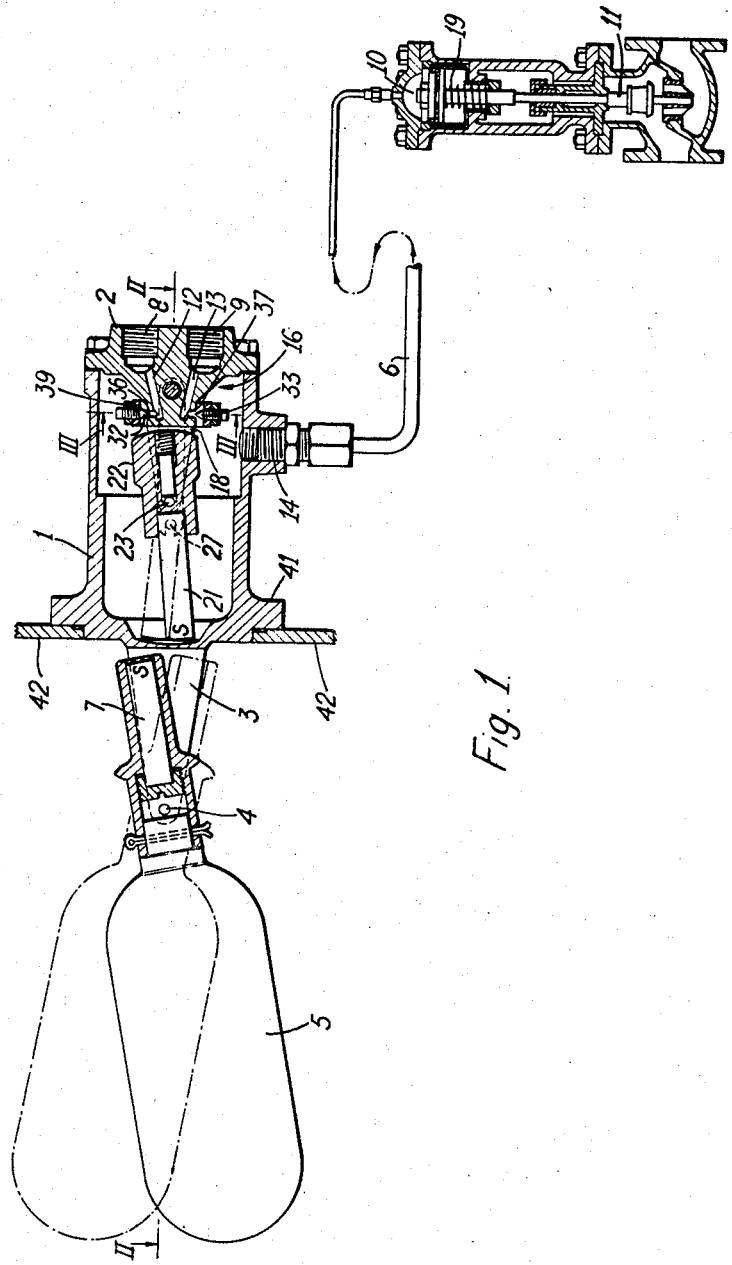
Figure 1 is a vertical cross-section through the valve connected to control a feed water valve.
Figure 2:
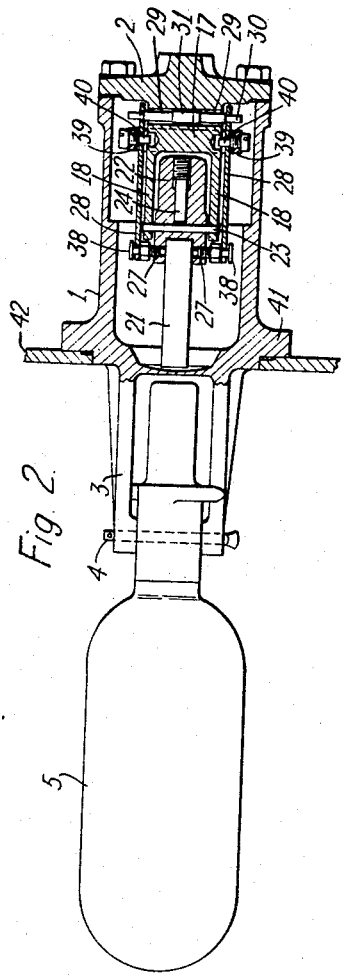
Figure 2 is a cross-section on the line II—II in Fig. 1 and shows the float in plan.
Figure 3:
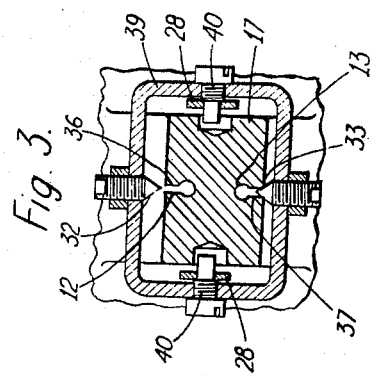
Figure 3 is a cross-section on the line III—III in Figure 1, and is on a larger scale.

The valve comprises a housing 1 with a closed end that seals an opening in a boiler 42, and a flange 41 which makes a tight joint round this opening. The housing carries a bracket 3 which projects into the boiler and carries a pivot pin 4. An assembly of a float 5 and a driving magnet 7 is mounted to rock about the pin 4 as the water level in the boiler varies.

The end of the housing 1 remote from the tank 42 is closed by a lid 2. This lid has a boss 16 which includes a substantially rectangular part 17 and two forwardly projecting arms 18. These arms 18 embrace and support an assembly of a driven magnet 21 and a block 22, the assembly being pivotally mounted and balanced about a pin 23 which passes through the block 22 into holes in the arms 18. A screw 24 bears firmly against the pivot pin 23 to prevent it moving axially. The magnets 7 and 21 present like poles to one another, and accordingly the driven magnet assembly lies in the position shown in Figure 1 until the float 5 rises to the position shown in dotted lines in Figure 1. The movements are of course reversed when the float falls.

The housing 1 contains air passages controlled by valves which are moved upon the rocking of the driven magnet. The housing is pressure-tight, and there are three openings which give access to the interior of the housing, two of these, 8 and 9, being in the lid and leading to passages 12 and 13. The opening 8 is connected to a supply of compressed air, whereas the opening 9 leads to atmosphere. The third opening 14 is connected by a pipe 6 to a piston chamber 10. When compressed air is fed into the piston chamber a feed water valve 11 is closed, and when the chamber 10 is vented a spring 19 takes charge and opens the feed water valve. Therefore the position of the valve 11 is determined by the flow through the pipe 6.

The passages 12 and 13 open from the boss 16 into the interior of the housing 1, their mouths merging into valve seats 36 and 37, and are controlled by valve members 32 and 33 respectively, of which one should always be off its seat while the other is firmly on its seat. When the valve member 32 is off its seat, air flows into the housing and through the pipe 6 to the piston chamber 10. When the valve member 33 is off its seat air flows away from the chamber 10 into the housing and out through the opening 9.

The valve members 32 and 33 are mounted in a rectangular yoke 39 which embraces the boss 16. The yoke is carried by pins 40 which pass through arms 28 parallel to the arms 18. The arms 28 each have an open-ended longitudinal slot which receives a pivot pin 27. The inner parts of these two pins are threaded so as to engage in correspondingly threaded parts in the block 22 and are screwed hard against the sides of the magnet 21 to bind the magnet securely to the pivot block 22. Split rings 38 are provided to prevent the arms 28 from sliding axially clear of the pins 27. The slots permit the rocking arms to move parallel to the magnet; moreover, since the split rings 38 do not normally bear against the arms, movement perpendicular to the line of the magnet is also possible.

The free ends of the arms 28 are interconnected by a pin 30, which passes through a cylindrical hole in the block 16 and has a short central length 31 of almost the same diameter as the bore of the hole and outer lengths 29 of smaller diameter. This construction enables the pin to rock about its centre part.

Upward rocking of the magnet 21 from the position shown in Figure 1 lifts the pins 27 and so causes the arms 28 to rock about the pin 30, carrying the pins 40, and therefore the frame 39, with them.

The valve members 32 and 33 are conical with conical angles of about 60°, and they are mounted so that at all times neither member is wholly clear of its valve seat. Thus as the yoke is moving one valve member onto its seat, the tapering edge of the member, if the axes of the member and its valve seat are out of alignment, slides easily along the complementary tapering sides of its valve seat and so guides the two axes back into alignment before the valve is closed. Since the valve members never move axially clear of their seats there is no danger of them moving laterally clear of them.

The mechanical construction illustrated here ensures that each valve member will sit truly on its seat despite the inaccuracies inherent in normal manufacture. This is achieved by deliberately manufacturing some of the parts with relatively large clearances. These clearances, though small, are large in relation to the axial movement of the valve members. By way of example, the pressure of the air to be controlled may be 120 lbs. per square inch and in one valve constructed as shown in the drawings the magnetic forces available are such that the valve seats 36 and 37 must be no greater than 1/16 inch in diameter. The valve members 32 and 33 are mounted in the yoke 39 so that the yoke moves only through ten to fifteen thousandths of an inch in changing over the valves. Longitudinal movement of the rocking arms 28 is permitted within limits imposed by the pivot pin, which lies in a bore of diameter from 0.2500 to 0.2505 inch and has a central length 5/16 inch long and of diameter from 0.2490 to 0.2495 inch, with outer lengths 3/16 inch in diameter and each 15/32 inch long.

These clearances allow sufficient flexibility to the various parts for any misalignment of the valve members to be counteracted. For example a small inaccuracy is difficult to avoid in the pins 27. The magnet 21 is made of a very hard metal, and in practice it is impossible to drill a hole right through it to house a common pin 27; it is for this reason that the rocking arms 28 are frictionally connected to the magnet by two separate pins. It is not easy to bore and tap holes in the block 22 accurately enough for the two pins 27 to be co-axial. Any slight inaccuracy here will cause the axis of the valve members to be inclined relatively to their seats. However by enabling the pin 30 to rock about its centre 31 and by enabling the arms 28 to rotate relatively to each other about the pins 27 the two axes are able to come into alignment. Any slight disparity in the perpendicular distances between the axis of the pin 30 and the axis of the valve seats or the axis of the valve members is counteracted by the ability of the arms 28 to move longitudinally; the clearance of about one thousandth of an inch around the central part 31 of the pin 30 in conjunction with the slots at the other end of the rocking arms allows this. The easy fit of the rings 38 on the pins 27 and the manner of attaching the arms to the pin 30 allows transverse movement of the valve members. When the valve members move from the one position to the other they describe a small arc of a circle; the inclination of their axes relative to their seats therefore changes, and this is offset by permitting the yoke 30 to turn on the pins 40.

Finally, the mechanical linkage provided according to the invention serves to multiply the force produced by the magnetic coupling.

I claim:

1. A valve for simultaneously controlling two passages each terminating in a valve seat comprising, a frame, two coaxial valve members mounted in said frame, arms rotatably mounting said frame, said arms and frame being movable whereby as one valve member is carried off its seat the other valve member is carried onto its seat, means mounting said arms for rocking movement relatively to one another about axes parallel to the rotating axis of said frame whereby the rocking movement of the arms and rotating of the frame assures axial alignment between the valve member and seat.

2. A valve structure according to claim 1 in which the rocking arms are interconnected by a pin which can rock about its midpoint.

3. A valve structure according to claim 2 in which the pin has a short central length fitting closely within a cylindrical bore and outer lengths of smaller diameter.

4. A valve according to claim 1 in which the rocking arms have slight freedom of transverse movement.

5. A valve for simultaneously controlling two passages each terminating in a valve seat, said valve seats being axially aligned and each facing away from the other, said valve comprising a frame mounted for rotation about an axis, two coaxial valve members mounted in said frame and each facing the other, arms rotatably mounting said frame, said arms and frame being movable whereby as one valve member is carired off its seat the other valve member is carried onto its seat, and means for mounting said arms for rocking movements relatively to one another about axes parallel to the rotatating axis of said frame whereby the rocking movement of the arms and rotating of the frame assures axial alignment between the valve member and seat.

References Cited in the file of this patent

UNITED STATES PATENTS

| | | |
|---|---|---|
| 346,913 | Heiss | Aug. 10, 1886 |
| 583,632 | Roesch | June 1, 1897 |
| 1,612,017 | Hastings | Dec. 28, 1926 |
| 1,894,367 | Corcoran | Jan. 17, 1933 |
| 2,231,158 | Davis | Feb. 11, 1941 |
| 2,561,316 | Rogers | July 17, 1951 |
| 2,731,231 | Garrott | Jan. 17, 1956 |

FOREIGN PATENTS

| | | |
|---|---|---|
| 697,795 | Great Britain | Sept. 30, 1953 |